US007406328B2

(12) United States Patent
Wallace

(10) Patent No.: US 7,406,328 B2
(45) Date of Patent: Jul. 29, 2008

(54) SYSTEM AND METHOD FOR CONFIGURING A SOFTWARE RADIO

(75) Inventor: Robert Leon Wallace, Ontario, NY (US)

(73) Assignee: Harris Corporation, Melbourne, FL (US)

(*) Notice: Subject to any disclaimer, the term of this patent is extended or adjusted under 35 U.S.C. 154(b) by 119 days.

(21) Appl. No.: 10/661,487

(22) Filed: Sep. 15, 2003

(65) Prior Publication Data

US 2005/0059427 A1 Mar. 17, 2005

(51) Int. Cl.
*H04M 1/00* (2006.01)
(52) U.S. Cl. .................... 455/552.1; 455/558; 455/410; 455/432.1; 455/436; 370/331
(58) Field of Classification Search .................. 455/418, 455/424, 425, 435.2, 403, 426.1, 435.1–2, 455/553.1, 552.1, 558, 410, 411, 432.1, 436; 370/331
See application file for complete search history.

(56) References Cited

U.S. PATENT DOCUMENTS

| | | | | |
|---|---|---|---|---|
| 5,999,811 | A * | 12/1999 | Molne | 455/432.3 |
| 6,125,283 | A * | 9/2000 | Kolev et al. | 455/552.1 |
| 6,353,846 | B1 | 3/2002 | Fleeson | |
| 6,504,867 | B1 | 1/2003 | Efstathiou | |
| 6,526,110 | B1 | 2/2003 | Bao et al. | |
| 6,631,261 | B1 * | 10/2003 | Farber | 455/432.1 |
| 6,782,080 | B2 * | 8/2004 | Leivo et al. | 379/93.04 |
| 2002/0068608 | A1 * | 6/2002 | Souissi | 455/557 |
| 2003/0050055 | A1 * | 3/2003 | Ting et al. | 455/419 |
| 2003/0137404 | A1 * | 7/2003 | Bonneau et al. | 340/10.41 |
| 2003/0214780 | A1 * | 11/2003 | Oh-Yang et al. | 361/683 |
| 2004/0005914 | A1 * | 1/2004 | Dear | 455/563 |
| 2004/0018853 | A1 * | 1/2004 | Lewis | 455/552.1 |
| 2004/0249625 | A1 * | 12/2004 | Leaming | 703/27 |

OTHER PUBLICATIONS

European Search Report for European Application No. 04021802.6.
Prehofer, C., et al., "Active Networks for 4G Mobile Communication: Motivation, Architecture and Application Scenarios," Proceedings of IWAN 02, LNCS 2546, 2002, XP002308070.
Jeffrey Steinheider, Software-defined Radio Comes of Age, "Mobile Radio Technology" Feb. 1, 2003.
Mark Cummings, Time for Software-defined Radio, EE Times Apr. 11, 2001.
John B Stephensen, Software-Defined Hardware for Software-Defined Radios, QEX Sep./Oct. 2002.
Mike Marcus, Linux, Software Radio and the Radio Amateur, QST 2002.

* cited by examiner

*Primary Examiner*—Nghi H Ly
(74) *Attorney, Agent, or Firm*—Duane Morris LLP

(57) ABSTRACT

A system and method for configuring a software defined radio is disclosed. In an embodiment, a smart card and smart card reader are used to access layered information pre-programmed into a software defined radio. The smartcard reader extracts configuration information from the smart card and the configuration information is used to configure the software defined radio. The configuration may include, communication protocols, modulation/demodulation techniques, digital processing protocols, coding/decoding techniques, security authorization; operational protocols, and other information. Individual users may be given different levels of access depending on, among other things, the user's service requirements, mission requirements, security clearance, and/or authorization level. The disclosed systems and methods significantly reduce the amount of time and training required for personnel to establish communications using a software defined radio.

18 Claims, 9 Drawing Sheets

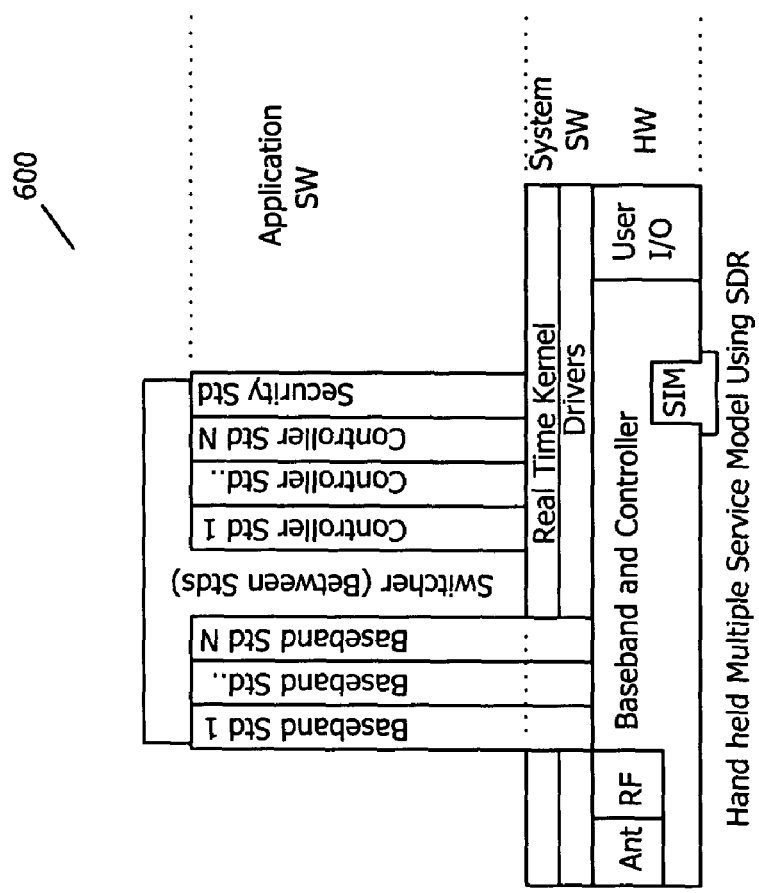
FIGURE 6
PRIOR ART
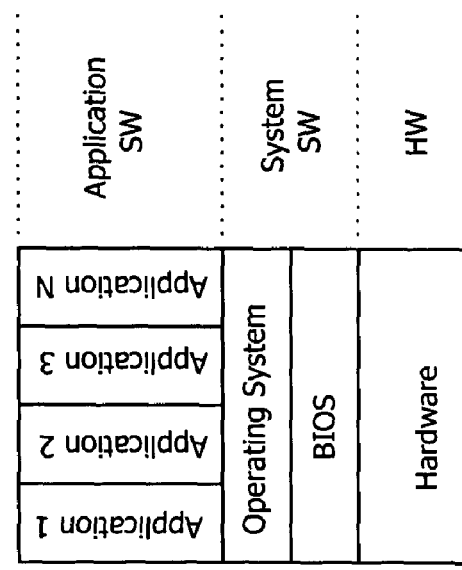

SYSTEM AND METHOD FOR CONFIGURING A SOFTWARE RADIO

BACKGROUND

Software-Defined Radio ("SDR") is a rapidly evolving technology that is receiving enormous recognition and generating widespread interest in the telecommunication industry. Over the last few years, analog radio systems are being replaced by digital radio systems for various radio applications in military, civilian and commercial spaces. In addition, programmable hardware modules are increasingly being used in digital radio systems at different functional levels. One goal of SDR is to take advantage of these programmable hardware modules to build an open-architecture based radio system software protocol.

SDR technology facilitates implementation of some of the functional modules in a radio system such as modulation/demodulation, signal generation, coding and link-layer protocols in software. This enables reconfigurable software radio systems where dynamic selection of parameters for each of the above-mentioned functional modules is possible. A complete hardware based radio system has limited utility since parameters for each of the functional modules are fixed. A radio system built using SDR technology extends the utility of the system for a wide range of applications that use, for example, different link-layer protocols and modulation/demodulation techniques.

The commercial wireless communication industry is currently facing problems due to, for instance, the constant evolution of link-layer protocol standards (2.5 G, 3 G and 4 G), the existence of incompatible wireless network technologies in different countries which inhibits the deployment of global roaming facilities, and in rolling out new services and/or features to the vast number of legacy subscriber radios which may not be 100% compatible with each other.

SDR solves these problems by implementing the radio functionality as software modules running on a generic hardware platform. Further, multiple software modules implementing different standards can be stored in the radio system. The system can take on different "personalities" depending on the software module being used. Additionally, the software modules that implement new services and/or features can be downloaded over the air onto the radios. These examples of the flexibility offered by SDR systems is indicative of the capabilities of SDR systems in dealing with problems due to the existing plethora of radio standards and issues related to deployment of new services and/or features.

The U.S. military also has a significant radio interoperability problem. The story is often told of army troops calling in air support to Grenada using their personal calling cards and using Fort Bragg as an intermediary to communicate.

Interoperability problems are also an obstacle in international joint operations (military and/or civilian), where each nation typically has its own radio systems and standards. Recent emphasis on peacekeeping, disaster relief, homeland security and other non-combat military operations has exacerbated the problem. In these roles, military units must communicate with public safety agencies, humanitarian organizations, and the civilian population. A single SDR device with the ability to support multiple waveforms significantly reduces the number of devices needed in the field. For military users, who must maintain, transport, supply power to, and manage each device under challenging operational conditions, the benefit of a streamlined system is substantial.

SDR also promises to reduce military radio development and acquisition cost. Without SDR, new device development requires investing anew in the implementation of each supported communication standard. With SDR, the bulk of implementation knowledge for a communication standard is captured in portable software, which can be reused at low cost in new or different platforms. This software reuse holds the potential to revolutionize radio procurement economics by significantly increasing competition among platform vendors, leading to reduced per-unit costs.

Public safety agencies in the United States and other countries also struggle with interoperability problems when collaborating with other public safety agencies.

In major emergency situations, from floods to plane crashes, a large number of local, state and federal agencies respond to the scene each having a radio that may not be compatible with the radio used by another responding agency. The incompatible radios, ranging from legacy analog FM systems, to digital trunked radios and even commercial cell phones, leave the agencies unable to efficiently communicate with each other. Decentralized purchasing decisions typically lead to the situation where different agencies within different municipalities acquire the radio systems that best meet that particular agency's needs without the though of interoperability problems with other agencies with whom interaction is foreseeable. As a result of this acquisition process, the voice and data communications systems of different agencies cannot interoperate and their databases cannot share information.

In a mutual aid scenario, multiple agencies must work together and communicate with little opportunity for prior planning, frequently outside the range of fixed communications infrastructure and in difficult terrain. It is unknown when and where the response will be necessary, and who will be involved. Ensuring interoperability in this context requires an extremely flexible and rapidly deployable solution.

SDRs provide software control for a variety of modulation techniques, wide-band or narrow-band operation, communications security functions, and waveform requirements of current and evolving standards over a broad frequency range. SDR software modules may operate on a generic hardware platform consisting of digital signal processing and general purpose microprocessors used to implement radio functions such as generation of a transmitted signal at the transmitter and tuning/detection of a received radio signal at the receiver.

SDR can be used to implement military, commercial and civilian radio applications as described above. A wide range of radio applications including, but not limited to, AM, AMSSB, FM, PSK, QPSK, FSK, AMPS, GSM, Bluetooth, WLAN, GPS, Radar, WCDMA, GPRS, TDMA, QAM, FDMA, TDD, CDMA, etc. can be implemented using SDR technology.

The radio functions of SDR may be implemented as software modules. Multiple software modules that implement different standards can co-exist in the radio equipment and radios. An appropriate software module can be chosen to operate depending on, for example, network requirements. This enables in establishing multi-mode radios and equipment resulting in ubiquitous connectivity irrespective of the underlying network technology used.

SDR technology supports over the air upload of software modules to subscriber radios. This enables network operators as well as radio manufacturers to perform mass customization of radios by uploading appropriate software modules thereby resulting in faster deployment of new services and/or features.

One of the key features of SDR is its reconfigurability. SDR allows for the co-existence of multiple software modules implementing different standards on the same system allowing dynamic configuration of the system by selecting the appropriate software module to be run. This dynamic configuration is possible both in radios as well as infrastructure equipment. This ability to reconfigure facilitates implementation of future proof, multi-service, multi-mode, multi-band, multi-standard terminals and infrastructure equipment.

SDR enables implementation of air interface standards as software modules and multiple instances of such modules that implement different standards can co-exist in infrastructure equipment and radios. This capability is key in realizing global roaming facility.

The potential benefits of SDR are manifold. Up to now, the configuration and reconfiguration required to achieve these benefits of the SDR have involved time intensive effort. Trained personnel have been required to manually configure or select the software modules to enable operation of the SDR.

Currently, military communications systems require significant operator intervention during the setup and configuration prior to and during operations. This encumbers the dynamic reconfiguration potential of SDRs. An object of the present disclosure is the use of a smart card system to access layered information already programmed into the system. Another object is to significantly decrease the amount of time and personnel training required for establishing communications, thus enabling SDRs to better realize their full potential utility.

These and many other objects and advantages of the disclosed subject matter will be readily apparent to one skilled in the art to which the disclosure pertains from a perusal of the claims, the appended drawings, and the following detailed description of the preferred embodiments.

DESCRIPTION OF THE DRAWINGS

FIG. 6 is a representation of SDR implementations in wireless handhelds

DETAILED DESCRIPTION

In order to recognize and appreciate the advantages of the disclosed subject matter, an overview of the operation and configuration of Software-Defined Radios follows.

Figure 1:
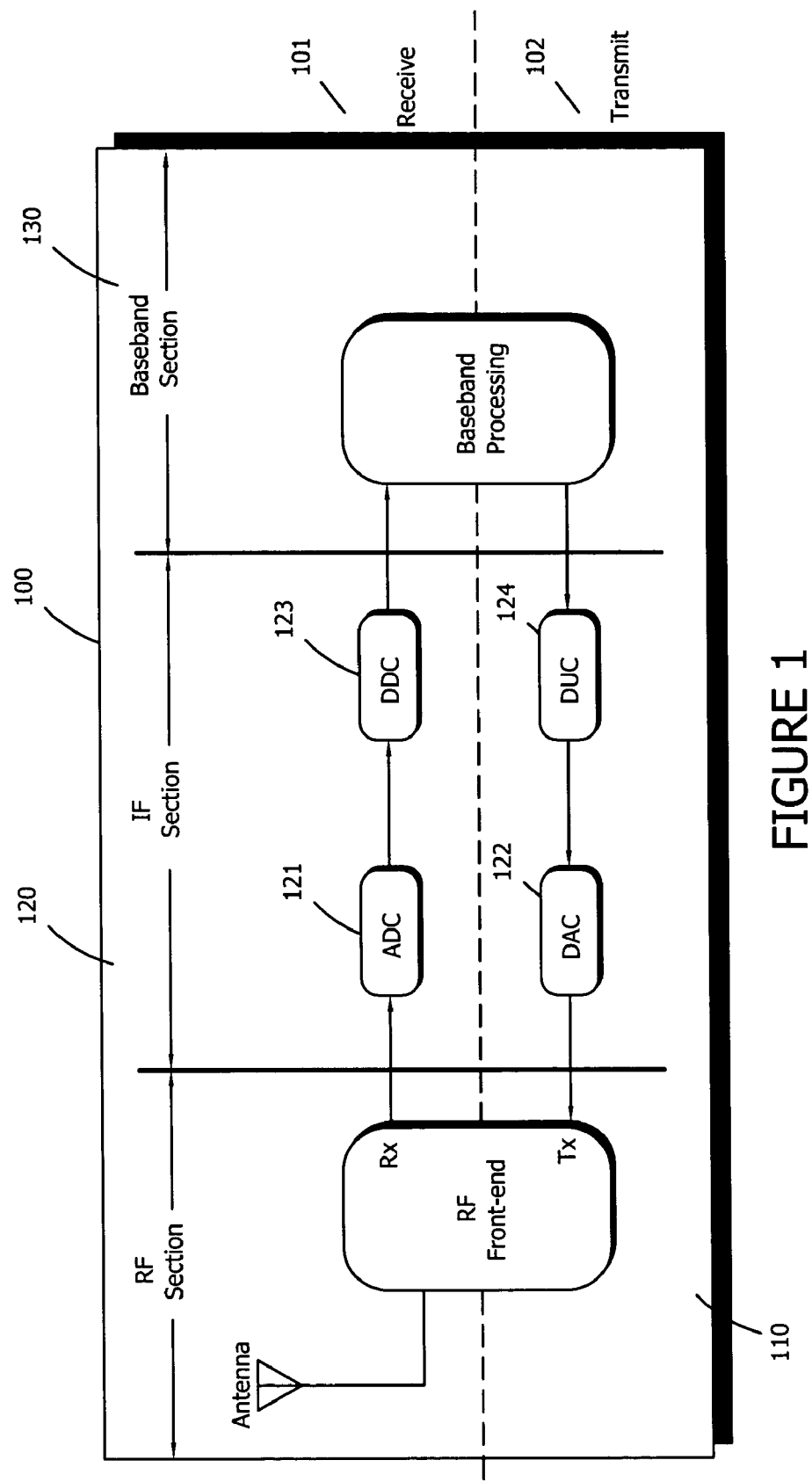
FIG. 1 is a block diagram of a generic digital transceiver.

A digital radio system 100 consists of three main functional blocks: RF section 110, IF section 120 and baseband section 130 as shown in FIG. 1. The RF section consists of essentially analog hardware modules while the IF and baseband section typically contain digital hardware modules. The RF section 110 or front-end is responsible for transmitting/receiving the radio frequency signal from the antenna and converting the RF signal to an intermediate frequency ("IF") signal. The RF front-end on the receive path 101 performs RF amplification and analog down conversion from RF to IF. On the transmit path 102, the RF front-end performs analog up conversion and RF power amplification.

The Analog to Digital Converter ("ADC"), block 121, and the Digital to Analog converter ("DAC"), block 122, perform analog to digital conversion (on the receive path) and digital to analog conversion (on the transmit path), respectively. The ADC and the DAC blocks interface between the analog and digital section of the radio system. The Digital Down Converter ("DDC"), block 123, and the Digital Up Converter ("DUC"), block 124, perform digital down conversion (on the receive path 101) and digital up conversion (on the transmit path 102), respectively. DUC/DDC blocks essentially perform modem operation, i.e., modulation of the signal on the transmit path 102 and demodulation (digital tuning) of the signal on the receive path 101.

The baseband section 130 performs baseband operations (e.g., connection setup, equalization, frequency hopping, timing recovery, correlation) and also implements the link-layer protocol.

The DDC/DUC and baseband processing operations require large amounts of computing power and these modules are generally implemented using Application Specific Integrated Circuits ("ASICs") or stock Digital Signal Processors ("DSPs"). Implementation of the digital sections using ASICs results in a fixed function digital radio system. If DSPs are used for baseband processing, a Programmable Digital Radio ("PDR") system can be realized. In other words, in a PDR system, baseband operations and link-layer protocols are implemented in software. The DDC/DUC functionality in a PDR system are implemented using ASICs. The limitation of this system is that any change made to the RF section of the system will impact the DDC/DUC operations and will require non-trivial changes to be made in the DDC/DUC ASICs.

A SDR system is one in which the baseband processing as well as the DDC/DUC modules are programmable. The availability of smart antennas, wideband RF front ends wideband ADC/DAC technologies and ever increasing processing capacity of DSPs and general-purpose microprocessors have fostered the development of multi-band, multi-standard, multi-mode radio systems using SDR technology. In addition, the link-layer protocols and modulation/demodulation operations are implemented in software. The programmability of SDR systems can also be extended to the RF section, e.g., performing analog to digital conversion and vice-versa at the antenna.

Figure 2:
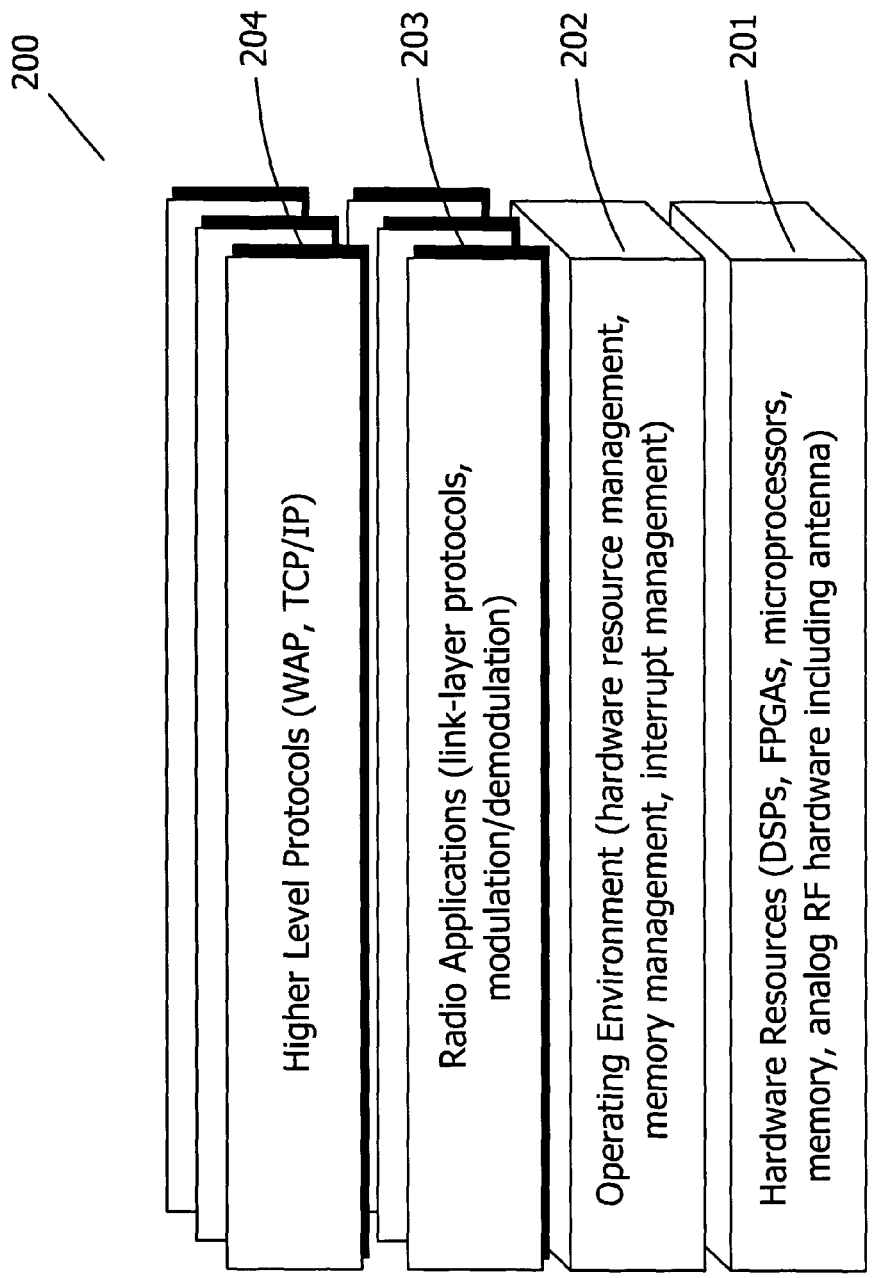
FIG. 2 is representation of Software Architecture of a Software-Defined Radio.

FIG. 2 illustrates a software component architecture in a typical SDR system 200. The system uses a generic hardware platform 201 with programmable modules (e.g., DSPs, FPGAs, microprocessors) and analog RF modules. The operating environment 202 performs hardware resource management activities such as allocation of hardware resources to different applications, memory management, interrupt servicing and providing a consistent interface to hardware modules for use by applications. In a typical SDR system, the software modules that implement link layer protocols and modulation/demodulation operations may be referred to as radio applications 203 which provide link-layer services to higher layer communication protocols 204 such as Wireless Application Protocol ("WAP") and Transmission Control Protocol/Internet Protocol ("TCP/IP").

The capability of general purpose microprocessors can be extended by the addition of math capabilities to create DSPs. Baseband low-speed portions such as vocoding functions are implemented mathematically in DSP Code.

Traditionally, A/D converters have provided the interface between the analog RF front end and the baseband section. Conventional A/D converters can support SDR implementations. However, A/D converters that are more flexible in dynamic range, bandwidth and other aspects can allow more efficient implementation of SDR.

Figure 3:
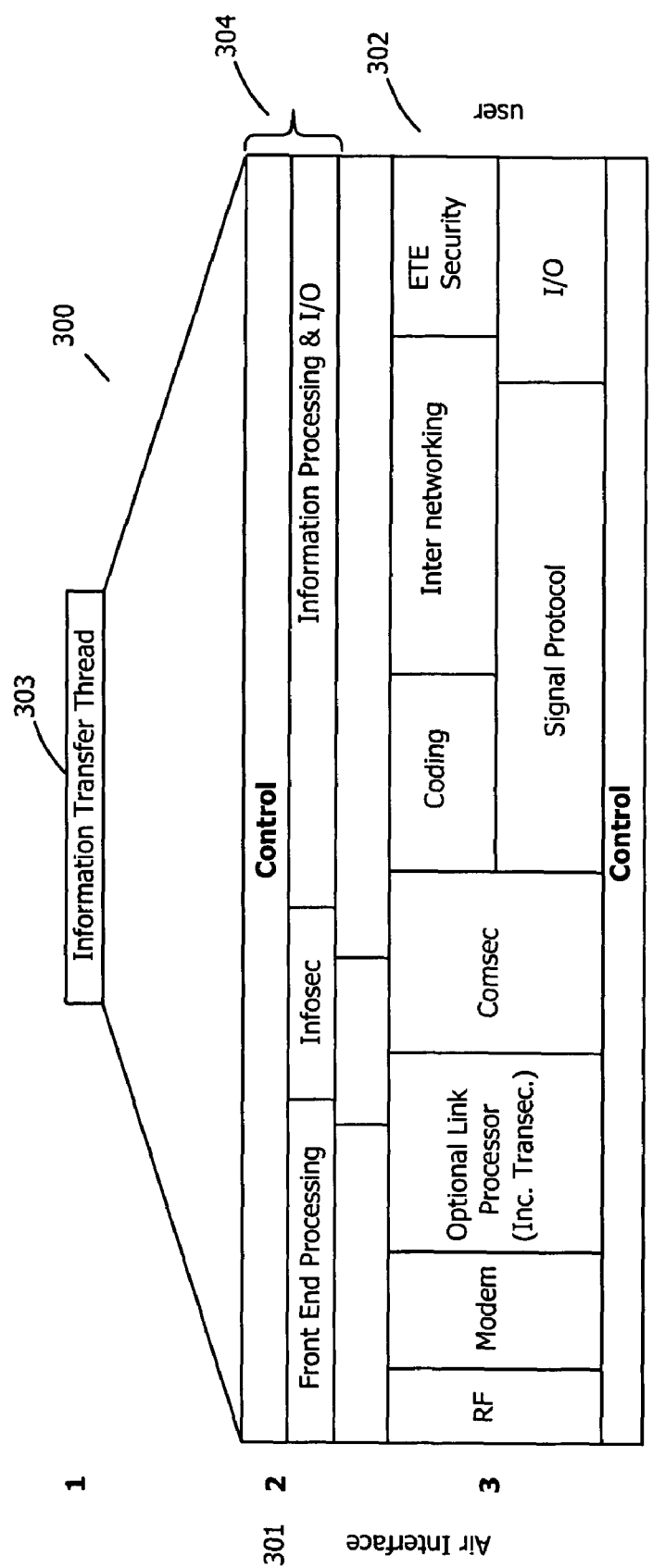
FIG. 3 is a representation overview of layered control for a Software-Defined Radio.

FIG. 3 illustrates a high-level hierarchical functional model 300 for a SDR system. Three views of increasing complexity are presented. The top-level view is a simple representation of an entire information transfer thread 303. The left side interface is the air interface 301. The right side interface is the wire side and the user interface 302. The middle-level view identifies a fundamental ordered functional flow of significant and necessary functional areas (front end processing, information security ("infosec"), and information processing and input/output ("I/O") processing.

The front end processing discussed previously is the functional area of the end user device that consists generically of the physical air interface, the front-end radio frequency processing and any frequency up and down conversion that is necessary. Also, modulation/demodulation processing is contained in this functional block area.

Information security is employed for the purpose of providing user privacy, authentication, and information protection. In the commercial environment, this protection is specified by the underlying service standard while in the defense environment, this protection is of a nature that must be consistent with the various Governmental doctrines and policies in effect.

Content or information processing is for the purpose of decomposing or recovering the imbedded information containing data, control, and timing. Content processing and I/O functions map into path selection (including bridging, routing, and gateway) multiplexing, source coding (including vocoding, and video compression/expansion), signaling protocol, and I/O functions.

The bottom-level view identifies more detail than the functional middle-level view, such as RF, Modem, Optional Link Processor, comsec, Coding, Internetworking, ETE Security, Signaling Protocol, and I/O.

Figure 4:
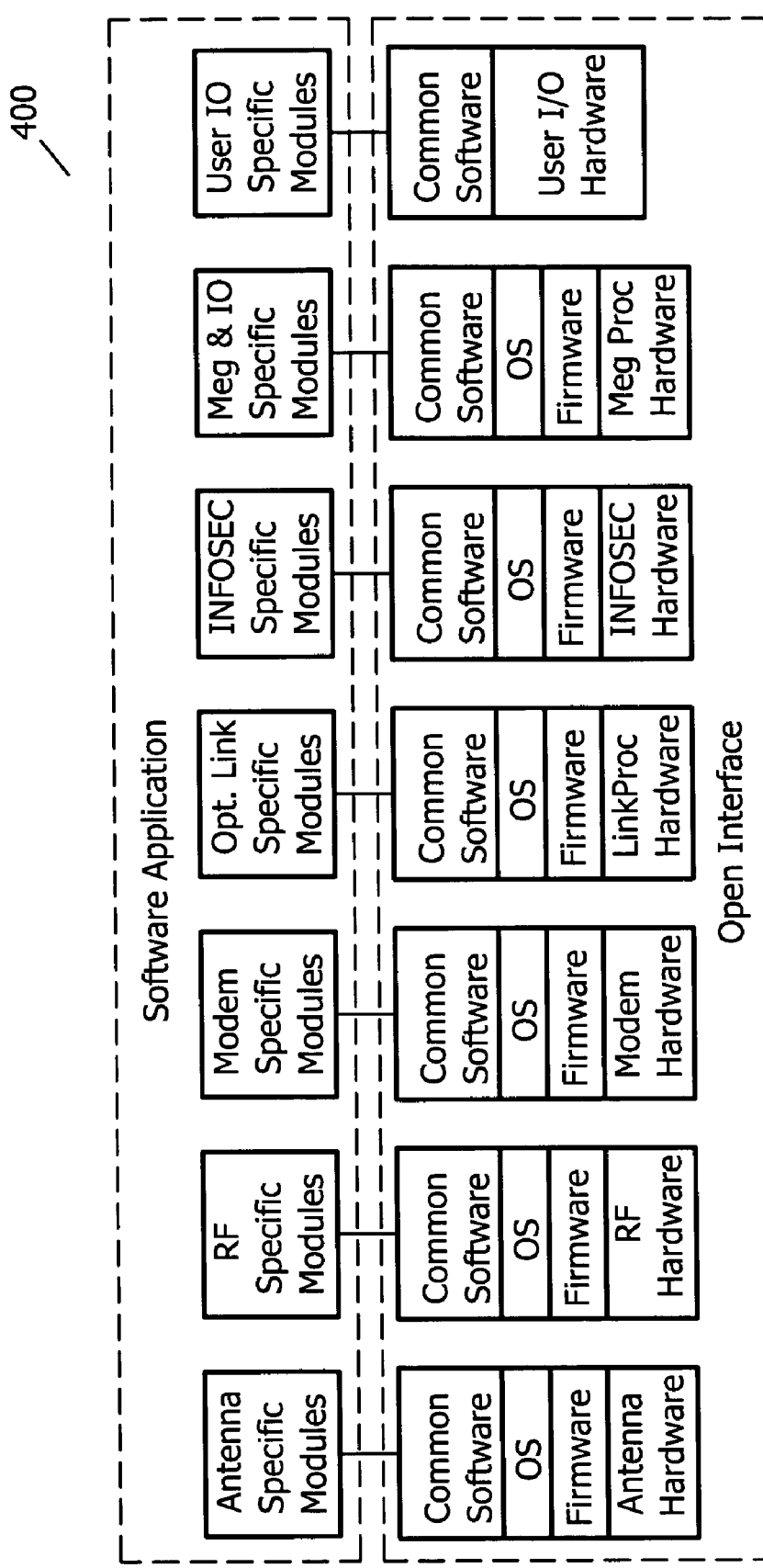
FIG. 4 is a typical implementation of SDR Software and Hardware Open architecture.

The SDR architecture consists of functions connected through open interfaces and procedures for adding software specific tasks to each of the functional areas. The software necessary to operate a SDR is referred to as a software application. FIG. 4 shows the SDR open architecture of seven independent subsystems interconnected by open interfaces. The seven subsystems shown are for illustration purposes only and are not intended to be an exhaustive or limiting list. In this view the generalized SDR functional architecture has been particularized by equating a subsystem definition to each functional area. In general, this is not the case. Typically, a subsystem will be determined based on implementation considerations. Interfaces exist for linking software application specific modules into each subsystem. Each subsystem contains hardware, firmware, an operating system, and software modules that may be common to more than one application. The application layer is modular, flexible, and software specific. The common software Application Program Interface ("API") layer, inferred in FIG. 4, is standardized with common functions having open and published interfaces.

Figure 5:
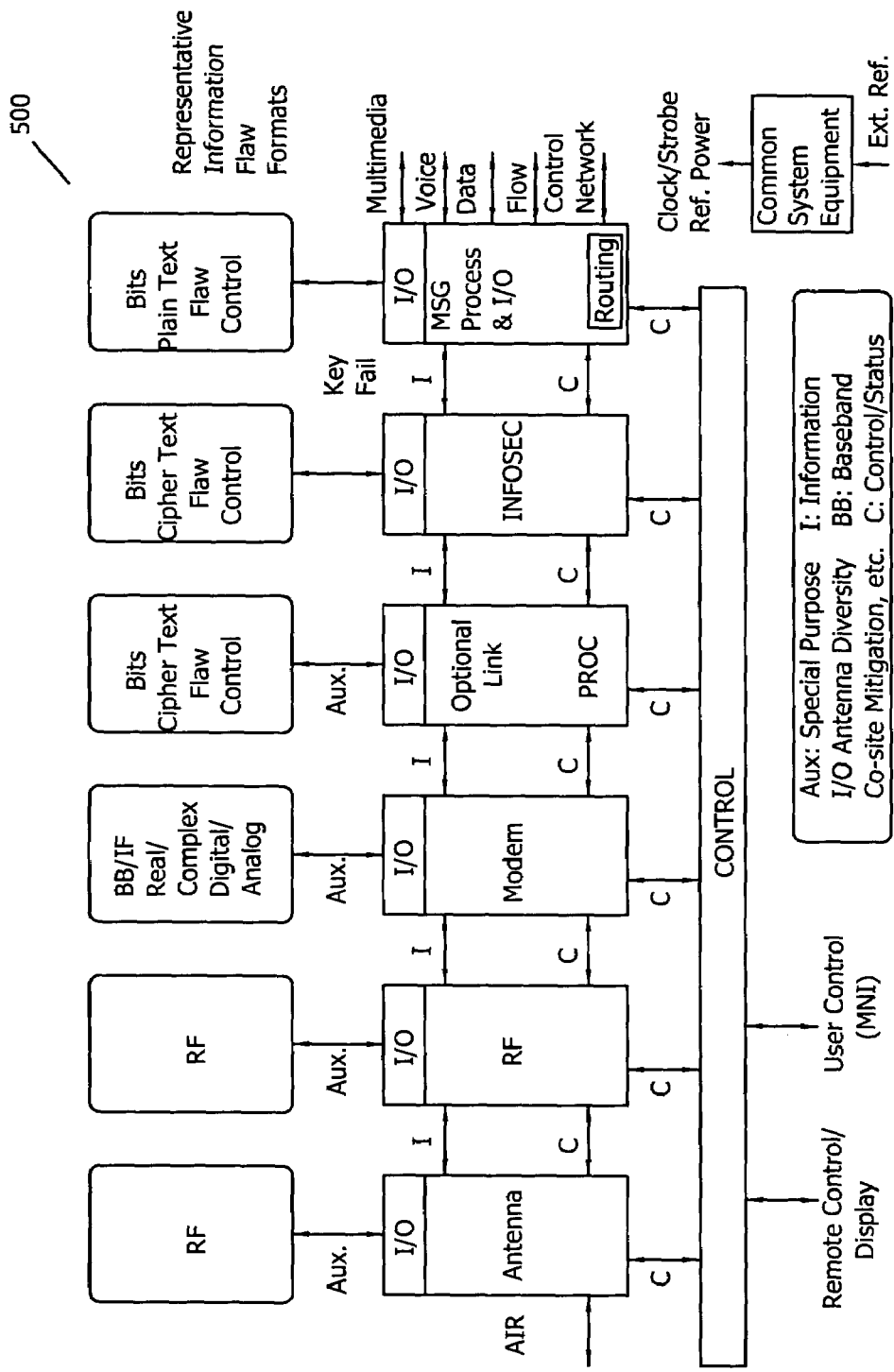
FIG. 5 SDR functional interface diagram.

FIG. 5 represents the functional interface diagram and demonstrates how the SDR architecture extends to the definition of functional interfaces. A representative information flow format is provided at the top of the diagram. Actual representations will be implementation dependent. Interfaces are identified for information and control. For example, information transfer is effected throughout the functional flow within the SDR to/from antenna-RF, RF-modem, Modem-INFOSEC, and INFOSEC-message processing interfaces. Control and status is effected between the same interfaces as information and control is effected between each functional module and one or more control points and interfaces. Auxiliary interfaces are also envisioned.

SDR provides control over each of the functional blocks as indicated by the control function. As an example, the frequency at which a wireless signal is generated is determined by frequency generation in the RF function. Through the control capability, an SDR terminal would allow this frequency to be changed to accommodate different operating environments.

The actual user traffic (i.e. data and information) being transmitted follows the paths illustrated by the "I" in FIG. 5. SDR works by providing control (the "C" in FIG. 5) over each of the functional blocks as indicated by the Control function. As an example, the frequency at which a wireless signal is generated is determined by frequency generation in the RF function. Through the control capability, an SDR terminal would allow this frequency to be changed to accommodate different operating environments (such as moving between regions with different frequency assignments).

SDR implementations in wireless handhelds can be viewed in comparison with a generic PC model in the form of a multiple service model as illustrated in FIG. 6.

The baseband implementations for each service are shown as cutting through the system software layer and directly interfacing the hardware layer because of the stringent performance constraints on execution speed and power consumption. A variety of technology approaches are being pursued depending on the constraints of the particular application. Battery power, size, with and cost requirements typically push the state of the art in handheld units. In order to achieve processing speed and efficiency, the majority of baseband implementations are programmed very close to the underlying hardware or logic, using low-level languages such as microcode or assembly code. The task of switching between multiple operating bands using the same or different RF hardware is managed by a combination of the service switcher and the controller services for each individual operational mode.

Figure 7:
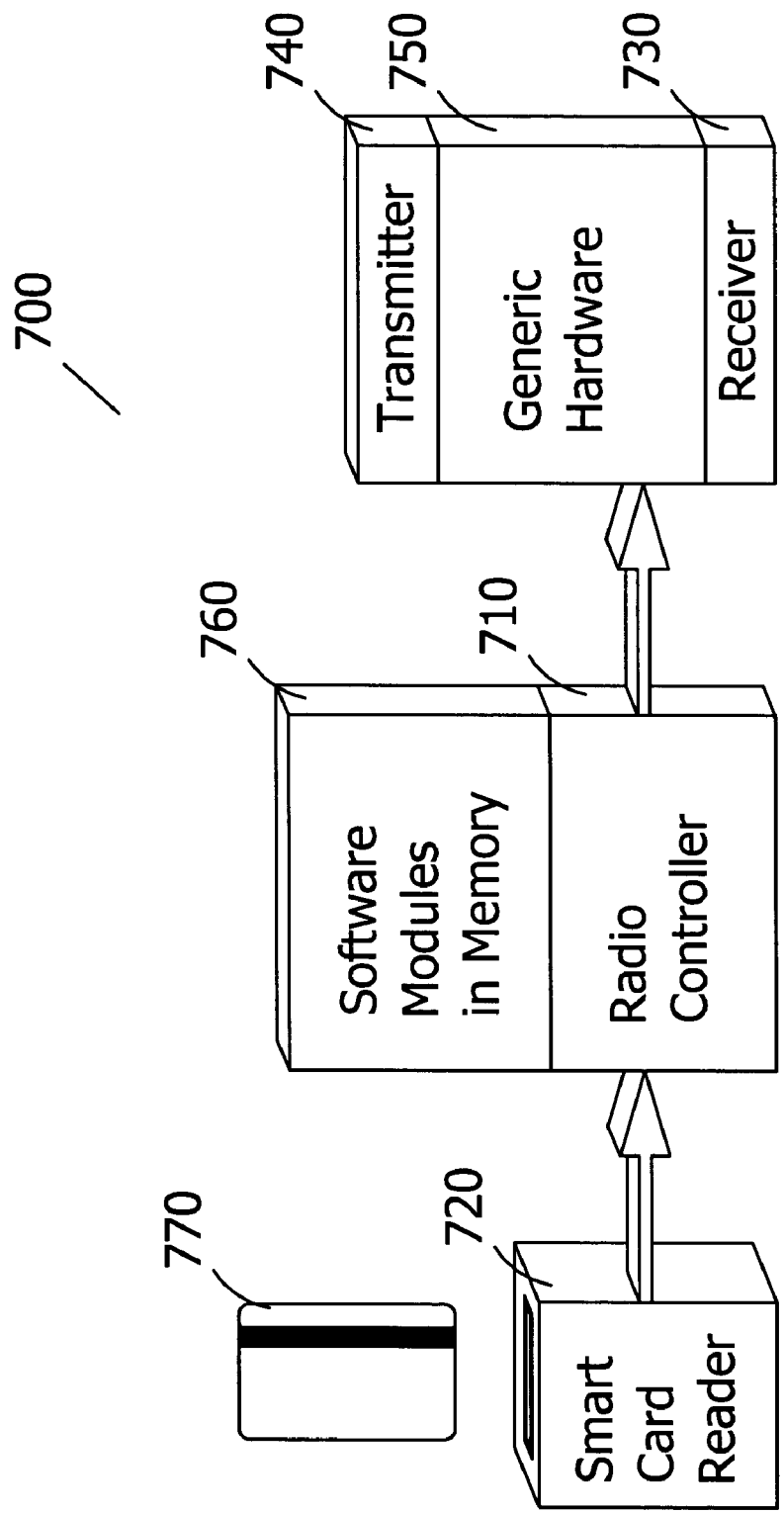
FIG. 7 is a representation of an SDR implementation with a smart card according to disclosed embodiments.

FIG. 7 is an implementation of an embodiment of a SDR according to an aspect of the present disclosure. The Software defined radio 700 is equipped with a smart card reader 720 that is able to retrieve information contained on the smart card 770. The smart card may contain information regarding authorization status for security and communication configurations. A radio controller 710, such as a microprocessor, has access to the various software modules necessary to implement one of many communication schemes including, without limitation, modulation/demodulation type, protocol, and other systems required to enable communications. The radio 700 includes a memory for storing the multiple software modules. The memory 760 can be advantageously integrated with the radio controller. The radio controller 710 selects and runs the appropriate software modules to drive the generic hardware 750 which enables the transmitter 740 to transmit a signal and the receiver 730 to receive a signal.

Figure 8:
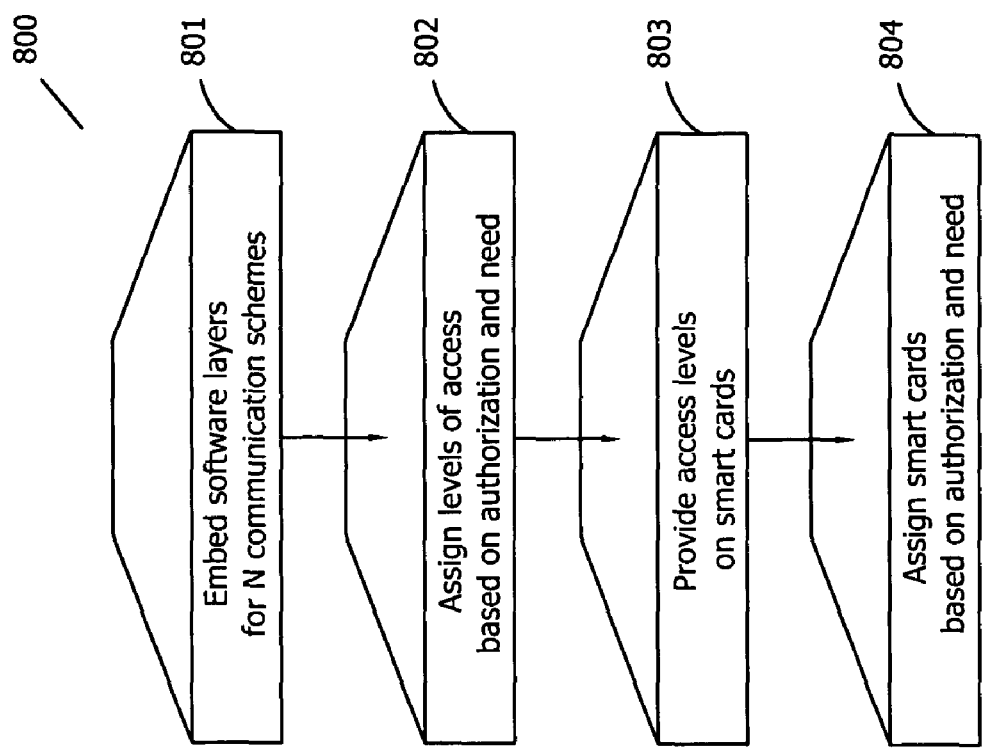
FIG. 8 is a flowchart of implementing a configurable implementation of an SDR according to a disclosed embodiment.

FIG. 8 is a graphical representation of a method for enabling the dynamic reconfiguration of the SDR with a smartcard. The SDR in block 801 is embedded with software layers for enabling N communication schemes. Levels of Access may be assigned based on, for example, user authorizations and operational needs in block 802. The Access levels and operational needs may be encoded on smartcards for distribution to SDR radio operators in block 803. Of course the distribution of the smartcards may also be determined based on security authorization and operational needs of the individual operator of the organizational unit to which the radio is assigned in block 804.

Figure 9:
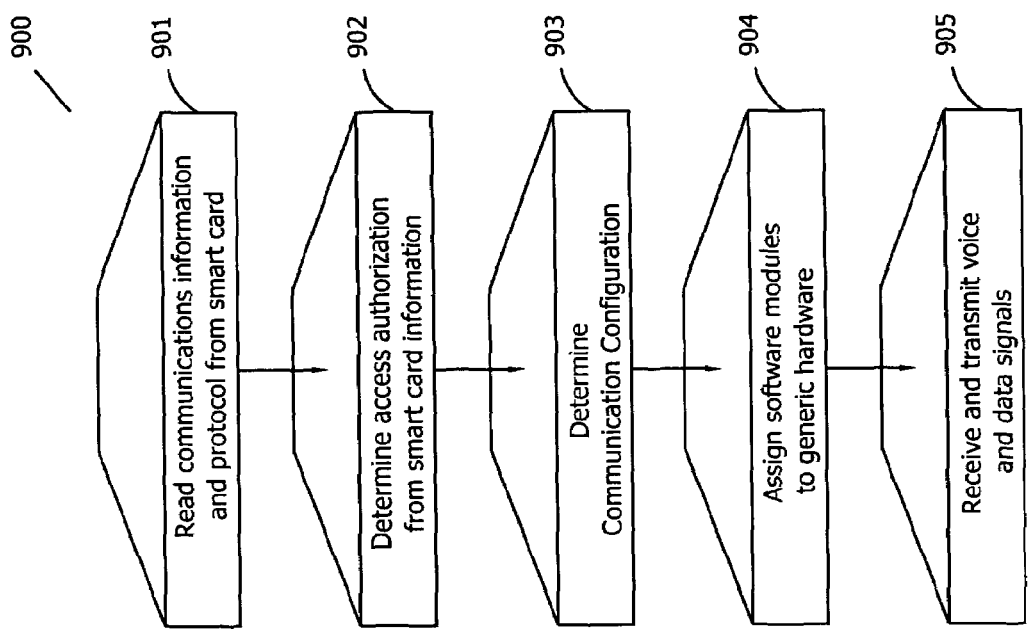
FIG. 9 is a flowchart representing the configuration of an SDR with a smart card according to a disclosed embodiment

FIG. 9 is a graphical representation of the operation of the SDR with a smartcard. A user or operator inserts the assigned smartcard into the smartcard reader of the SDR. The smartcard reader retrieves configuration and authorization information from the smart card in block 901. The SDR, from information contained on the smartcard, determines Access authorization in block 902 and communication configurations in block 903. If the authorization is valid, the SDR assigns and executes the appropriate software modules to drive the generic hardware based on the indicated configuration in block 904. This dynamic configuration is enabled by information from the smart card and thus allows the radio to communicate, for example, with the proper modulation/demodulation, DSP and link protocols as shown in block 905.

While preferred embodiments of the present invention have been described, it is to be understood that the embodiments described are illustrative only and that the scope of the invention is to be defined solely by the appended claims when accorded a full range of equivalence, many variations and modifications naturally occurring to those of skill in the art from a perusal thereof.

The invention claimed is:

1. A software defined radio comprising:
a plurality of layered communication schemes;
a configuration system for selectively enabling one of the plurality of layered communication schemes comprising a processor, a smartcard reader and a memory;
wherein a one of the plurality of communication schemes is selected and enabled by the processor based on configuration information from a user's smartcard, and wherein said configuration information includes at least a security authorization, and
wherein the selection and enabling of the communication scheme is a function of the security status of the user.

2. The software defined radio according to claim 1, wherein the plurality of communication schemes includes a plurality of communication protocols.

3. The software defined radio according to claim 1, wherein the plurality of communication schemes include a plurality of modulation/demodulation techniques.

4. The software defined radio according to claim 1, wherein the plurality of communication schemes include a plurality of coding/decoding techniques.

5. The software defined radio according to claim 1, wherein the information retrieved from the smart card comprises a communication scheme.

6. The software defined radio according to claim 1, comprising a programmable A/D converter or a programmable D/A converter.

7. The software defined radio according to claim 6, wherein a program for driving the programmable A/D converter or programmable D/A converter is stored in the memory.

8. The software defined radio according to claim 1, comprising a programmable digital signal processor.

9. The software defined radio according to claim 8, wherein a program for driving the programmable digital signal processor is stored in the memory.

10. In a software defined radio ("SDR"), the SDR comprising layered communication information and plural communication protocols, a method of configuring the SDR, the improvement comprising the steps of:
providing a smartcard containing configuration information;
retrieving the configuration information from the smartcard;
validating access authorization from the configuration information;
configuring the SDR based on the configuration information, wherein said configuration information includes at least a security; and
selecting the layered communication information and plural communication protocols as a function of a user's access authorization.

11. The method of claim 10, wherein the step of configuring further comprises selecting and executing stored software modules for driving generic radio hardware according to the configuration information.

12. The method of claim 11, wherein the generic radio hardware is selected from the group consisting of microprocessors, modulators/demodulators, and digital signal processors.

13. In a software defined radio ("SDR") comprising multiple link-layered communication protocols, a method for configuring the SDR, the improvement comprising retrieving configuration instructions from a smartcard containing a specific configuration, wherein said configuration instructions includes at least a security authorization, and selecting multiple link-layered communication protocols as a function of a user's security authorization.

14. The method of claim 13, wherein the specific configuration includes, modulation/demodulation type, digital processing and operational protocols.

15. The method of claim 13, wherein the specific configuration is selected from the group consisting of AMSSB, FM, PSK, QPSK, QAM, FSK, TDMA, CDMA, FDMA, AMPS, and GSM.

16. A software defined radio comprising a RF Section, a IF section and a baseband section, wherein the IF section and the baseband sections are programmable, a plurality of software modules containing programs for the IF section and the baseband section, the improvement comprising a smart card reader, wherein information retrieved by the smart card reader designates the respective programs for the IF section and the baseband section, and wherein said information is a function of service requirements, mission requirements and security status of a user.

17. The software defined radio of claim 16, wherein programs are selected from the group enabling AMSSB, FM, PSK, QPSK, QAM, FSK, TDMA, CDMA, FDMA, AMPS, and GSM configurations.

18. A method for configuring a radio with software for communicating in a wireless environment, the method comprising the steps of: receiving configuration information from a smart card in communication with the radio; configuring the radio in accordance with the configuration information and verifying current validity of the smart card from the configuration information, said configuration information allowing the radio to communicate in the wireless environment, wherein said configuration information includes security authorization and mission requirements of a user.

* * * * *